E. F. OSBORNE.
STEAM HEATING APPARATUS.
APPLICATION FILED NOV. 23, 1903. RENEWED FEB. 7, 1910.

1,049,595.

Patented Jan. 7, 1913.

Witnesses:—
Carl H. Crawford
W. L. Hall

Inventor:—
Eugene F. Osborne
by Pooler Brown
his Attorneys

E. F. OSBORNE.
STEAM HEATING APPARATUS.
APPLICATION FILED NOV. 23, 1903. RENEWED FEB. 7, 1910.

1,049,595.

Patented Jan. 7, 1913.

Witnesses:-
Carl H. Crawford
W. L. Hall.

Inventor:-
Eugene F. Osborne
by Robert Brown
his Attorneys

E. F. OSBORNE.
STEAM HEATING APPARATUS.
APPLICATION FILED NOV. 23, 1903. RENEWED FEB. 7, 1910.

1,049,595.

Patented Jan. 7, 1913.

Witnesses:—
Carl A. Crawford
W. L. Hall

Inventor:—
Eugene F. Osborne
by Poole & Brown
his Attorneys

E. F. OSBORNE.
STEAM HEATING APPARATUS.
APPLICATION FILED NOV. 23, 1903. RENEWED FEB. 7, 1910.

1,049,595.

Patented Jan. 7, 1913.

UNITED STATES PATENT OFFICE.

EUGENE F. OSBORNE, OF CHICAGO, ILLINOIS, ASSIGNOR TO OSBORNE STEAM ENGINEERING COMPANY, OF CHICAGO, ILLINOIS, A CORPORATION OF ILLINOIS.

STEAM-HEATING APPARATUS.

1,049,595. Specification of Letters Patent. Patented Jan. 7, 1913.

Application filed November 23, 1903, Serial No. 182,335. Renewed February 7, 1910. Serial No. 542,643.

*To all whom it may concern:*

Be it known that I, EUGENE F. OSBORNE, a citizen of the United States, of Chicago, in the county of Cook and State of Illinois, have invented certain new and useful Improvements in Steam-Heating Apparatus; and I do hereby declare that the following is a full, clear, and exact description thereof, reference being had to the accompanying drawings, and to the letters of reference marked thereon, which form a part of this specification.

This invention relates to improvements in steam heating apparatus for heating buildings, and refers more particularly in its general aspect to that class of heating systems, shown in my prior application for United States Letters Patent, Serial No. 68,722, filed July 18th, 1901, wherein air or other displacing agent is mixed with steam at or prior to its entrance into the heating devices or radiators and acts as a controlling element to increase or decrease the radiating or condensing area of the radiators and thereby their heating capacity.

Among the objects of the invention is to provide an improved device for introducing the displacing element into the system, which is so constructed that the introduction of the displacing agent is controlled according to the heat and pressure of the steam on the feed side of the heating devices. This feature of my invention may manifest itself in a device which is operated to exclude the displacing agent from the system when the system is operating under certain maximum and minimum pressure except so much thereof as may in a natural or usual manner find its way thereinto with the steam, and to admit such displacing agent only when the system is operating under an intermediate pressure.

Another object of my invention is to provide means whereby the several radiators or heating devices of a system may be automatically operated under varying conditions, and to this end means are provided whereby more of the displacing agent, such as air, may be introduced into certain of the heating devices from the circulatory main than into other heating devices, connected with that main. In this manner, controllable and non-controllable heating devices may form part of the same system.

A still further object of the invention is to provide means for connecting a thermostat to the heating device of a pressure system in such manner as to prevent the escape of aqueous vapor from such thermostat and from thence to the walls of a room.

Another further object of the invention is to enable a portion of a steam heating system, which is normally operated at a greater than atmospheric pressure to be operated at substantially less than atmospheric pressure, in which manner it becomes possible to use, in one or more of the radiators, the residue of the heat after the generating plant has been closed for a given period, as for the night.

Among other objects of the invention is to improve the connecting fittings between the radiators and the circulatory pipes, whereby the operation of the system may be made more sensitive to control and whereby the economy of its operation may be conserved.

The invention consists in the matters hereinafter set forth and more particularly pointed out in the appended claims.

Figure 1:
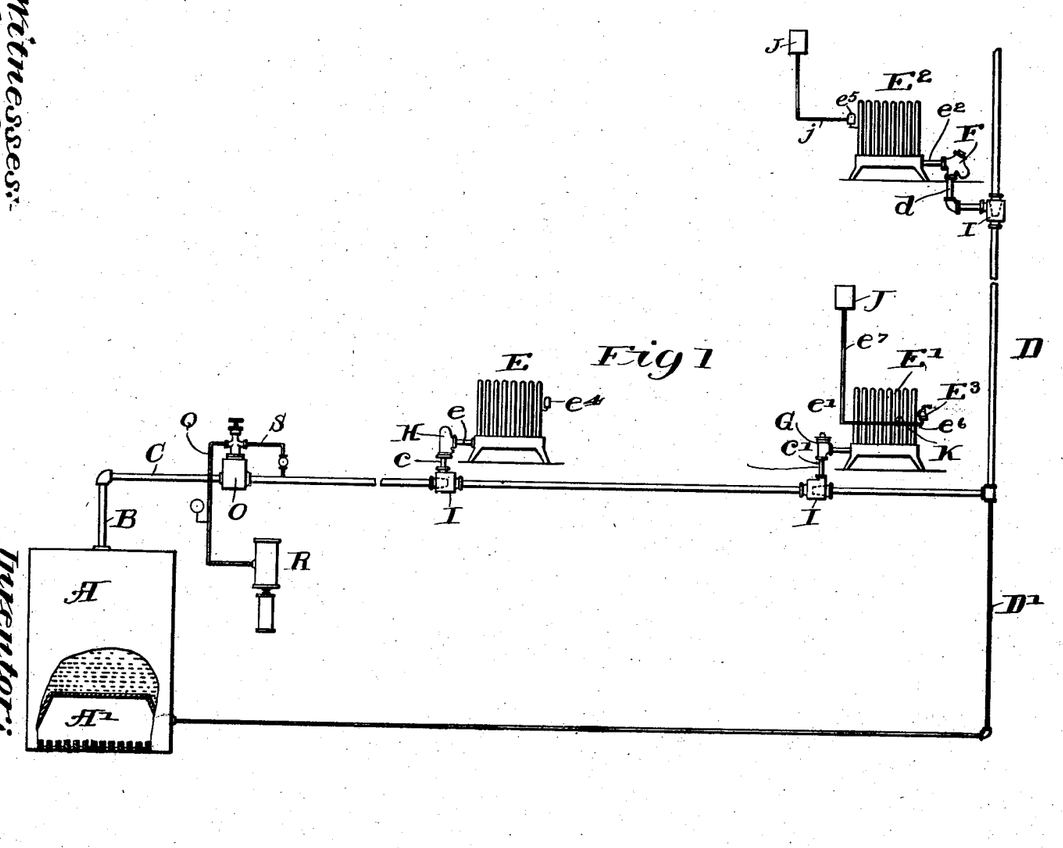
—Figure 1 is a diagrammatic view of a heating system embodying certain of the improvements designed for admitting air to the system.
Figure 2:
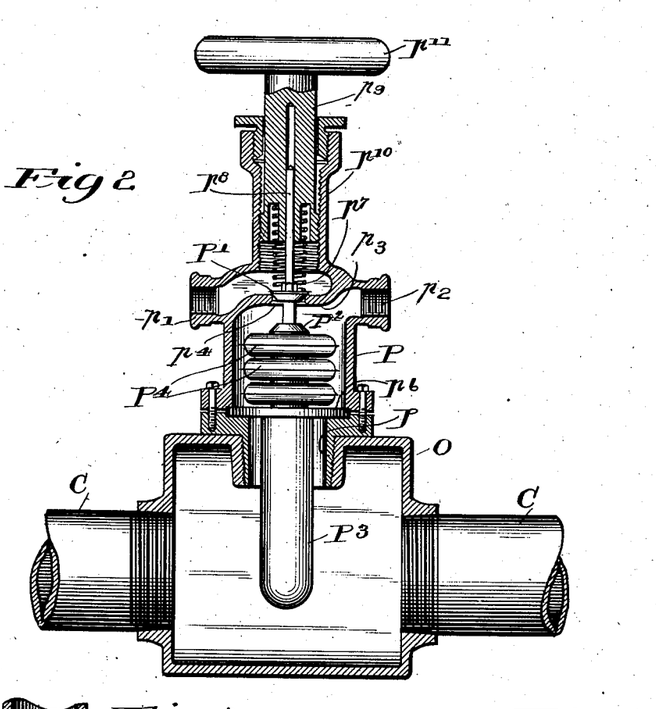
Fig. 2 is a vertical section of the valve for admitting air or other displacing agent to the steam supply pipe.

First referring to the general arrangement of the system shown in Fig. 1, A designates a steam generator provided with a furnace, $A^1$. The furnace may, and desirably will in practice, be provided with a suitable automatic damper apparatus controlled by the generator pressure for regulating the admission of air to the furnace, whereby the air supplied to the furnace and, therefore, the heat generated in the furnace is proportioned to the pressure under which it is desired to operate the system. Such apparatus is not shown as its use in many forms is common. B designates a steam supply pipe leading from the steam space of the generator and connected at its upper end with a horizontal steam pipe C constituting one of the steam mains. D designates an ascending pipe connected at its lower end with said horizontal pipe C. $D^1$ designates a drip pipe connected with the lower end of the ascending pipe D and entering the lower end of the generator A, and through said pipe the water of condensation from the pipes C and D is conducted back to the generator. E $E^1$ $E^2$ designate heating devices, herein shown as having the form of conventional house radiators, which are connected with the pipes C and D. The radiators herein shown are of the "single feed" type, that is to say, of that type wherein the water of condensation is discharged from the radiator through the same pipe by which steam is admitted to the radiator. As will hereinafter more fully appear, however, the "double feed and return" type of radiator may be employed. Steam enters the radiators from the main steam pipes through feed seal fittings F G and H, shown in detail in Figs. 5, 6 and 7 to 10, inclusive, respectively. The fittings shown in Figs. 5 and 6 each embrace a check valve which opens inwardly toward the radiators, whereby, when the pressure in the radiators is greater than that in the circulatory system, the air in the radiators is prevented from escaping into the circulatory pipes of the system, while the fitting shown in Figs. 7 to 10 is of the water seal type.

Figure 5:
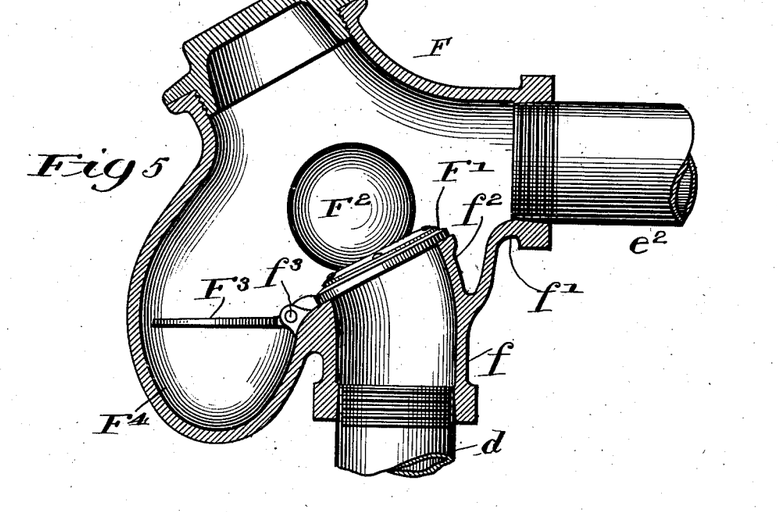
Figs. 5 and 6 illustrate in vertical section two forms of feed seal fittings through which steam is admitted to the radiators and through which water of condensation is conducted therefrom.

Referring now to the construction of the fitting F shown in Fig. 5, and illustrated in Fig. 1 as connected with the radiator $E^2$, it consists of a casing provided in its bottom with a branch $f$ which is connected by a pipe $d$ with the steam supply pipe D and at one side with a lateral branch $f^1$ connected with the steam inlet pipe $e^2$ of the radiator $E^2$, (Fig. 1). Continued upwardly from said branch $f$ is a tubular extension $f^2$ having an inclined upper end forming an inclined seat against which seats an upwardly opening valve closure $F^1$ which is hinged at $f^3$; said closure opening to permit steam to pass through the fitting to the radiator and closing to prevent the backward flow of air from the radiator through the fitting. When the pressure in the radiator is less than that in the pipe system, said closure opens to admit steam to the radiator and the closure is at this time held open by the kinetic energy of the steam current. When steam is cut-off from the system and the radiator becomes filled with air under a pressure higher than that of the steam pipes, the valve closure is held closed by reason of the superior pressure of the air in the radiator and prevents the escape of air from the radiator. Attached to the upper side of said closure is a float $F^2$, whereby, when the chamber of the fitting is filled with water of condensation from the radiator the buoyancy of the float acts to lift or hold the closure open and permits the water to escape from the fitting to the level of the upper end of the tube $f^2$ through the pipe $d$. Said closure seats by gravity when the conditions are such as to permit of this action. The overfilling of the chamber of the fitting by water-of-condensation is likely to occur in case steam should leak into the radiator at a time the radiator is closed, and, should this occur, the float will raise the closure and permit the water to escape from the fitting to the return pipe, after which the closure will be seated by gravity, assisted by the superior pressure in the radiator. It will be understood that when steam is flowing into the radiator, in the usual operation of the system, the closure is held open and that water of condensation passes continuously from the fitting, and that the float feature of the valve is available when the valve is normally closed, as before stated. As a further and separate improvement, I provide a cataract governor for controlling the opening and closing movements of the check valve closure, whereby said movements will not be abrupt and the closure will not be seated with such force as would tend to quickly wear the closure and its seat. Said governor consists of a flattened arm or disk $F^3$ attached rigidly to the closure at its hinge and extending into a chamber $F^4$ formed in one side of the fitting and which is designed to be filled with water to the level of the lower side of the upper end of the tubular extension $f^2$. Consequently the disk or arm $F^3$ is submerged in water and the body of water serves to retard the movements of the closure in the manner of a cataract valve.

Referring now to the fitting G, shown in connection with the radiator $E^1$ it consists of a shell or casing provided with inlet and outlet branches $g$ $g^1$, respectively, the former of which communicates with the chamber of said casing through the bottom wall thereof and the latter through the side wall. The lower branch $g$ communicates with a pipe $c^1$ communicating with the steam supply pipe C and the latter is connected with a steam pipe $e^1$ which communicates with the adjacent radiator $E^1$. The inlet branch $g$ projects a distance upwardly into the casing and terminates in an annular flange $g^2$, the upper end of which constitutes a seat against which seats a downwardly closing valve closure $G^1$. Attached to the upper side of said closure is a float $G^2$ having a stem $g^3$ which engages a suitable guide socket in the upper wall of the casing. With this construction, when the pressure in the radiator is less than that in the pipe system, the said closure opens to permit steam to enter the radiator, being held open by the kinetic energy of the steam current, and when the difference in the pressures is reversed the closure seats and prevents the escape of air from the radiator into the pipe system. When the water of condensation collects in the chamber of said fitting it raises the closure through the medium of the float and allows the water to escape from the fitting to the level of the upper margin of the extension or flange $g^2$.

Figure 6:
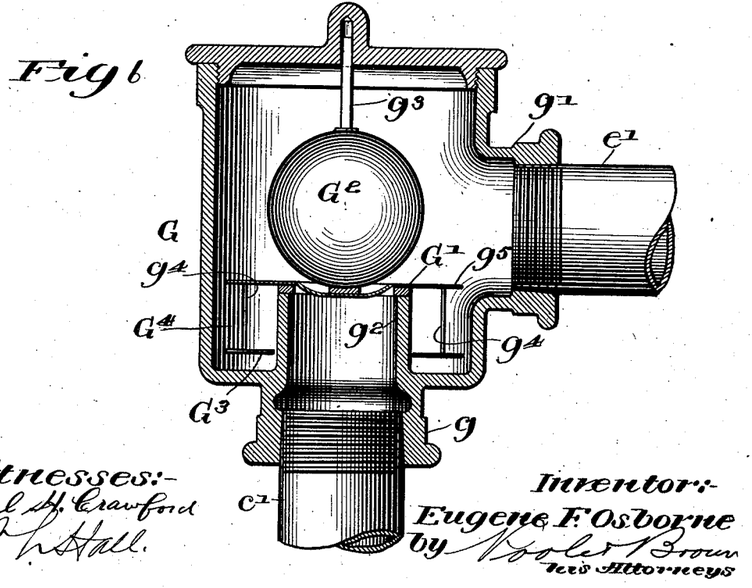

I have provided a cataract governor for controlling the opening and closing movements of the valve closure $G^1$ which operates in the manner of the governor shown in Fig. 5. The governor herein shown consists of a flat, horizontal, ring or piston $G^3$ which is located in an annular chamber $G^4$ located around the flange $g^2$ and between the same and the wall of the casing, and said ring is submerged in the body of water in said annular chamber. Said ring is connected with the check valve closure by means of vertical stems $g^4$ rising from the ring and attached at their upper ends to radial arms $g^5$ projecting from the valve closure.

Figure 7:
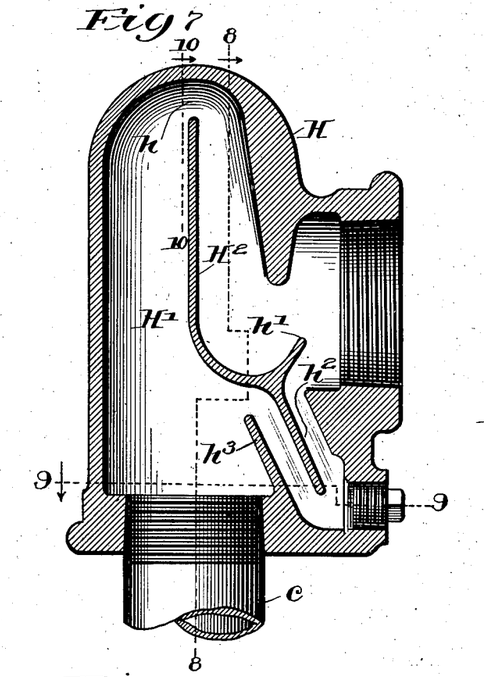
Fig. 7 is a vertical section of still another form of feed seal fitting.
Figure 8:
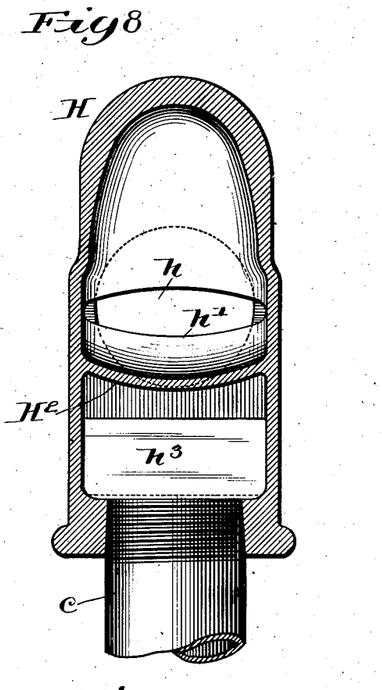
Fig. 8 is a section, taken on line 8—8 of Fig. 7.
Figure 9:
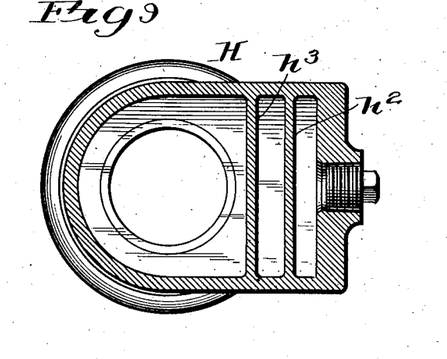
Fig. 9 is a section, taken on line 9—9 of Fig. 7.
Figure 10:
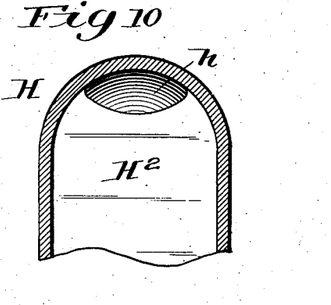
Fig. 10 is a section, taken on line 10—10 of Fig. 7.

Referring now to the water seal fitting H, shown in detail in Figs. 7 to 10, inclusive, it consists of a hollow casting having a central chamber $H^1$ and provided with inlet and outlet openings in its lower and side walls. The chamber communicates through said lower opening and a pipe $c$, with the main steam pipe C and communicates through the side opening and the radiator pipe $e$ with the radiator E. The chamber is provided at its upper end with a vertical partition $H^2$ which extends laterally across the chamber and partially separates the parts of the chamber directly communicating with the bottom and side openings. Said partially separated parts of said chamber communicate with each other at the top of the partition through a horizontally elongated opening $h$, (Figs. 7, 8 and 10). The partition turns laterally at its lower end toward the side opening and terminates in an upwardly curved lip $h^1$. Extending downwardly and laterally from said laterally curved part of the partition is a wing $h^2$ which extends into a chamber formed between the side wall of the chamber and an upward and rearwardly inclined web or partition $h^3$, the upper margin of which is below the level of the lower wall of the side opening of the chamber. The dipping of said wing $h^2$ into said chamber constitutes a seal which, when the chamber is filled with water to the level of the web or partition $h^3$, operates to allow the undisturbed exit of the water of condensation from the radiator to the supply pipe through said seal while preventing the passage of steam from the supply pipe to the radiator at this point, and directing the steam supply through the opening $h$ at the top of the partition $H^2$. The location of said opening $h$ in said partition is at the top thereof, while permitting the admission of steam to the radiator such as to heat the latter, prevents the passage of air from an air filled radiator to the steam supply pipe at a time when the pressure in said supply pipe and radiator are equalized, this being due to the fact that under such equalized condition of the pressure, the weight of the column of air at one side of the partition prevents said air from falling over the partition into the supply pipe so long as the pressure in the radiator is not substantially greater than that in the supply pipe. The upwardly and forwardly curved lip $h^1$ of the partition $H^2$ serves to deflect the steam which passes downwardly from the opening $h$ upwardly away from the bottom of the pipe $e$ and thereby does not act with a retardation effect upon the outflowing water of condensation.

Figure 3:
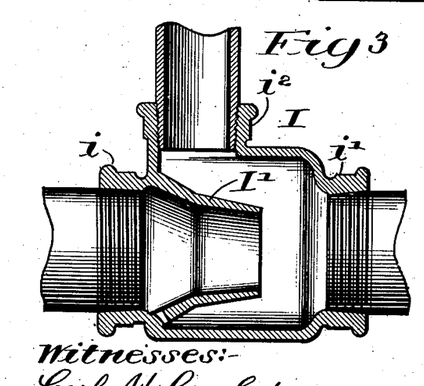
Figs. 3 and 4 show in vertical section, two forms of a fitting located between the steam supply pipe and the radiator steam pipe for conducting steam and air to the radiators.

The pipes which connect the inlet branches of the feed seal fittings F G and H with the main steam pipes C and D communicate with said steam pipes through special fittings I shown in detail in Fig. 3. Said fitting consists of a shell having at its ends, branches or prolongations $i$ $i^1$ constituting a through-opening in the shell. The parts or sections of the main steam pipe in which the fitting is included are connected with the branches $i$ $i^1$. Opening from one side of said shell at right angles to the branches $i$ $i^1$ is an outlet branch $i^2$ with which is connected the pipe leading to the adjacent feed seal fitting. The said fitting I is provided with an internal conical flange $I^1$ which extends in prolongation of the branch $i$ of the fitting and a distance past the lateral branch $i^2$ thereof. The inner, smaller end of said conical flange $I^1$ is made of but slightly smaller diameter than that of the steam pipe in which it is included, while the larger end is made of somewhat greater diameter than said steam pipe. The said internal conical flange $I^1$ may communicate at its larger end with either the inlet or the exit branch of the fitting, depending upon the particular function which is to be derived from the use of said fitting, as will now be explained. It is to be understood that the fitting shown in said Fig. 3, and just described is designed for use in a system wherein the air or other displacing agent is mixed with the steam prior to its entrance to the radiator or heating device. The air is mixed with the steam for the purpose of employing the same as a controlling agent whereby the heat radiating or condensing capacity of the radiators may be varied. In some instances, little or no control of this character is desired, and in such event little or no air or displacing agent will be admitted to the radiator; while in a radiator wherein full control of its heating capacity is desired, a full percentage of air or displacing agent is admitted to the radiator.

The operation of the fitting I to unequally distribute steam and air which coöperate with the special fitting herein shown to produce the desired result is as follows:—It may first be premised that when steam mixed with air, or other non-condensable displacing agent which is heavier than the steam, is passing through a pipe, the air or other agent is found to lie near the walls of the pipe and also to have less velocity than the steam, though not in proportion to its greater density. The kinetic energy of a given volume of air is greater, therefore, than that of a given volume of steam. Further, the steam is condensed on the walls of the pipe and runs away as water, while the air, being noncondensable, does not so change its condition or its position. As the kinetic energy of a given volume of air is greater than that of the steam, the air is less easily deflected from a straight path than the steam. By reason of these several properties and actions of the air and steam, when the fitting I is so arranged that the steam current enters the side of the fitting adjacent to the large end of the interior flange or extension $I^1$ of said fitting, the kinetic energy of the moving air prevents the deflection of any considerable amount of air to the radiator; but the steam, by reason of its less kinetic energy, is more easily deflected and will pass upwardly through the branch $i^2$ to the radiator. Therefore, a much larger volume of steam than air will pass to the radiator through the fitting arranged as described. When, on the other hand, the mixed steam and air current enters the fitting in a reverse direction, that is to say, enters the end of the fitting adjacent to the smaller end of the conical flange $I^1$, the air being principally near the walls of the pipe, will pass to the radiator in a greater percentage, relative to the percentage of steam, than in the first described arrangement. The combined effect of the differences in kinetic energy and of condensation of the steam produces the results above described notwithstanding the effects of the law of diffusion which tends to maintain the mixture of the two gases or fluids homologous. It will be understood that the same fitting is employed for both of the uses mentioned, it being only necessary to reverse its position in the pipe to provide for dissimilar uses. In order to appreciate the advantage and the occasion for use of this fitting, it may be assumed that the radiator E is located in a part of the building in which no regulation is required, or where a substantially uniform heat is desired, as for instance, in the hallway of a public building; while the radiators $E^1$ $E^2$ are located in rooms of the building where it is desired to control the temperature thereof in accordance with variable demands or requirements. The radiator E, in which no control is necessary or required is provided, with a usual form of hand or automatic air valve $e^4$ combined with a check valve to prevent the passage of air at atmospheric pressure thereinto, while the other radiators are provided with special devices for controlling the discharge of the air or other displacing agent from the radiators and thereby control the heating capacity thereof.

Figure 4:
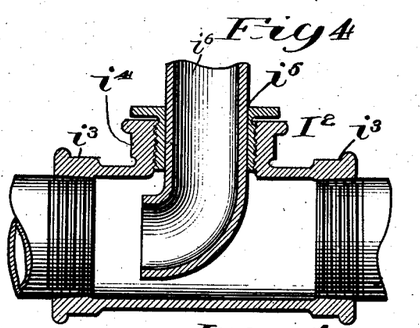

In Fig. 4 I have shown a modified form of fitting designed for use in place of the fitting I, though not so effective in its operation. As shown therein, $I^2$ designates a T-shaped fitting to the ends $i^3$ $i^3$ of which the sections of the main steam pipe are designed to be attached. The lateral branch $i^4$ of said fitting contains a bushing $i^5$ within which fits a pipe or tube $i^6$ which is adapted at its upper end to enter the superjacent feed seal fitting. The inner end of said pipe $i^6$ is directed laterally toward the inlet or outlet end of the fitting, depending upon the position of the fitting relatively to the flow of steam therethrough. If the laterally turned inlet end of the tube is directed toward the inlet branch of the fitting, air will enter the radiator connected with said fitting in quantities sufficient to exert a controlling effect on the radiating capacity of the radiator. If the position of the tube be reversed, that is to say directed toward the exit end of the fitting, but little air will be conducted to the radiator with the result of little or no control of the heating capacity of the radiators.

The manner in which the presence of air in the radiators acts to control or limit the radiating capacity of such radiators will now be explained.

Each radiator which is to be controlled is provided with a thermostatically actuated air valve of that class designed to permit the escape of air from a cold radiator, when steam is first admitted to the radiator, and to be closed when steam reaches the valve to prevent the escape of steam from the radiator. Inasmuch as the radiator E is not designed to be controllable it is not equipped with anything further than the usual air valve to permit the escape of air from the radiator in starting the system in operation. The radiators $E^1$ $E^2$, and as many others of a system as desired, are equipped with thermostatic valves J which are connected with the radiator air valves and are controlled by the varying temperatures of the apartments in which the radiators are located to regulate the escape of air or other displacing agent from the radiators and thereby vary the heating capacities of said radiators. The application of the thermostats J to the two radiators are somewhat varied with respect to each other, and the application of the thermostat to the radiator $E^2$ will first be explained. Connected by a pipe $j$ with the discharge passage of the air valve $e^5$ of the radiator $E^2$ is one of the thermostatically controlled valves J, which may be made of any preferred construction, the purpose of which is to control the escape of air or other displacing agent from the radiator upon variations of temperature in the apartment being heated, permitting the escape of air from the radiator and the increased supply of steam thereto when the temperature of the apartment reaches a predetermined minimum point, and closing said radiator against the escape of air and limiting the supply of steam thereto after a certain maximum temperature is reached.

When steam is first admitted into the radiator $E^2$, the radiator being at this time filled with cold air, the valve $e^5$ and thermostatic valve are open, so that the body of steam entering the radiator acts to drive before it and out through said valve $e^5$ the air contained in said radiator. When the steam reaches the valve $e^5$ it heats the thermostatic member thereof and acts in a familiar manner to close said valve, whereupon the escape of steam through said valve is prevented, and during the continued admission of commingled steam and air to the radiator, the steam condenses in the usual manner and thereby gives off its heat which is radiated to the surrounding space, while the non-condensable air collects on the side of the radiator adjacent to the air valve $e^5$. In the meantime, as the temperature of the apartment containing the radiator rises the valve of the thermostat J closes. The presence of the body of air in the radiator on the side thereof remote from its steam inlet side, and which is constantly increasing in volume, limits or restricts the radiating or condensing capacity of the radiator and also serves to isolate the air valve from the heat of the steam, so that after a time said air valve becomes cooled and opens. In case the temperature of the air has dropped in the apartment sufficiently to open the valve of the thermostat J, the cold air is free to escape from the radiator and admit the inflow of an increased supply of steam. In case, however, the valve of the thermostat is closed at a time when the air valve opens the air will not escape from the radiator until the heating capacity of the radiator has been so limited as to reduce the temperature of the apartment and thereby permit the valve of the thermostat to open and allow the air to escape from the radiator. The air escapes from the radiator until the steam again impinges against the thermostatic member of the air valve and heats the same in a manner to close said valve. Thereafter the controlling function of the air is repeated in the same manner as before described so long as steam and air are delivered to the radiator.

Figure 11:
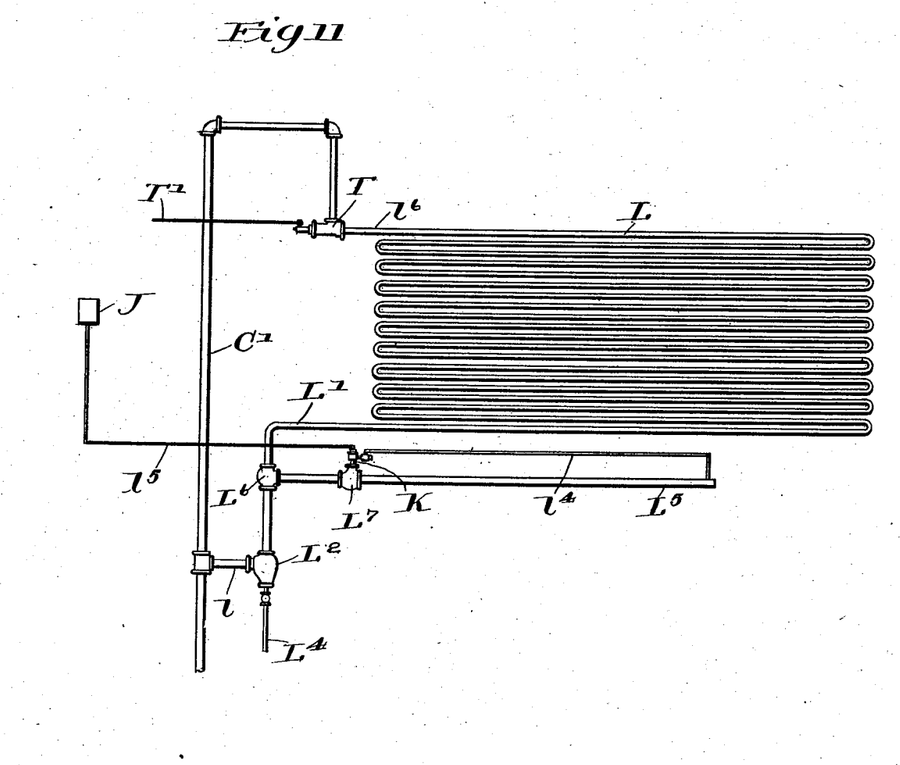
Fig. 11 illustrates a double feed and return radiator of the coil type (though it may be of other form) showing the application thereto of fittings for controlling the admission of steam and a displacing agent to the radiator and the discharge of the water of condensation therefrom.
Figure 14:
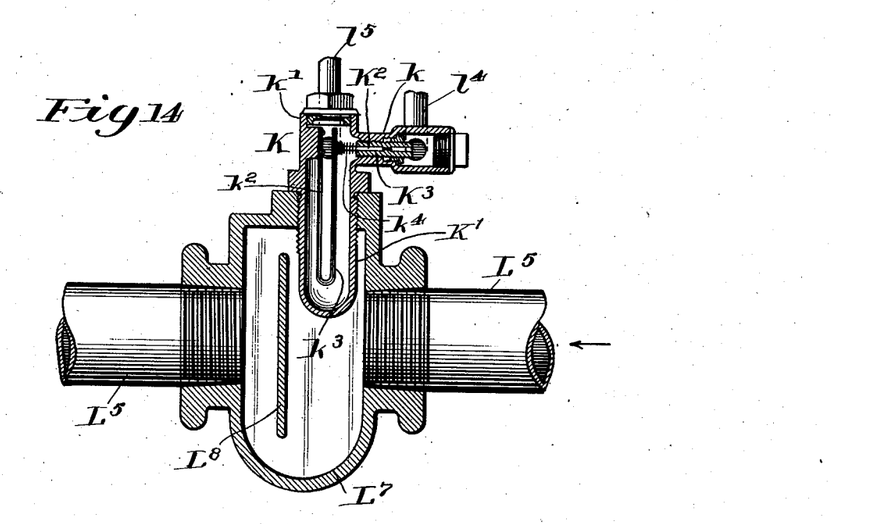
Fig. 14 is a sectional view of a thermostatically actuated radiator air valve and fitting therefor to prevent the escape of saturated steam through the same.

The thermostatically controlled air valve K connected with the radiator $E^1$ (Figs. 1, 16, 17 and 18) is not located in the last coil, as is the air valve of radiator $E^2$, but is shown as located in the third coil from the rear of said radiator. In Fig. 11 the valve K is shown as applied to a coil-form of radiator. In the construction shown in Figs. 1, 16, 17 and 18, the valve K is adapted for connection by a pipe $e^6$ with a hand actuated valve $E^3$ connected with the last coil of the radiator at the location of the usual automatic air valve, (Fig. 1), and is connected by a pipe $e^7$ with the thermostat J. The thermostatically actuated valve K is shown in detail in Fig. 14, and is there shown in connection with the coil-form of radiator illustrated in Fig. 11. The essential construction and operation of the valve is the same, however, in all of the adaptations herein shown. Said valve is made as follows: $K^1$ designates a tube which is closed at its inner end and is adapted to be inserted into the radiator in position for the steam in the radiator to impinge thereagainst. The said tube $K^1$ is provided with an inlet branch $k$ which, in the arrangements shown in Figs. 1, 16, 17 and 18, communicates with the pipes $e^6$, and with an outlet branch $k^1$ connected, as shown in said last mentioned figures, with the pipe $e^7$ leading to the thermostat J. As shown in Figs. 1, 16, 17, and 18, the valve K is partially inserted into an opening in one of the coils of the radiator, the casing of the valve being exteriorly screw-threaded to engage the interior screw-threads in said opening. In Fig. 11, the valve is likewise inserted into a fitting $L^7$ hereinafter to be described. In the adaptation of the valve shown in Fig. 14, to the coil-form of radiator, the inlet and outlet branches communicate, respectively, with pipes $l^4$ $l^5$, having the same function as the pipes $e^6$, $e^7$, respectively, of the radiator shown in the other figures referred to. Inasmuch as the valve K is illustrated in Fig. 14 as associated with a fitting of the radiator shown in Fig. 11, and the adaptation thereto, which is hereinafter described, a repetition of the illustration of the valve is deemed unnecessary. Between said inlet and outlet branches of the valve is located a thermostatically controlled valve consisting, in this instance, of a stem $K^2$ (Fig. 14) which is contained partially in a tube $K^3$ located in the inlet branch $k$ and having a tapered end adapted to engage a like shaped seat in said tube. $k^2$ $k^3$ designate the arms of a U-shaped thermostatic device located in said tube $K^1$. The free end of one of said arms is attached to the fitting wall, and the free end of the other arm bears against the inner end of the stem $K^2$ of the valve in a manner tending to force the tapered end against its seat. A spring $k^4$ surrounding said stem tends to hold the valve open. When steam impinges against said tube $K^1$ it, as well as the thermostatic bars, become heated and the free end of the bar $k^3$ is thrown outwardly and closes the valve; and when said parts become cooled, the spring $k^4$ opens the valve. The valve $E^3$ of the radiator $E^1$ is open during the usual operation of the said radiator, so that, when the thermostatically controlled air valve K is open, air passes from the radiator therethrough and to the thermostat J and when said valve K is closed the escape of air from the radiator ceases. Located in the base of the radiator $E^1$ beneath the loop containing the thermostatic valve K is a depending diaphragm $E^4$ (Figs. 16, 17 and 18) which divides the loop at one side of the radiator from the adjacent loop at the other side thereof, and said diaphragm dips at its lower edge into a chamber $E^5$ which is depressed below the general level of the floor of the radiator base, as shown more clearly in Figs. 16 and 17. When said chamber is filled with water the water submerges the lower edge of the diaphragm and the parts thereby constitute a trap which prevents the passage of steam from one loop to the other at the lower end thereof and also prevents the backward passage of air from the loops filled with air to the loops filled with steam. So long as the air is prevented from passing from the rear loops through the valve K and thermostat J, the steam cannot pass into said air filled loops nor, at this time, will air pass from said air filled loops to the loops filled with steam or steam and air, owing to the fact that the air is heavier than the steam and will not tend to pass upwardly from the first air loop into the upper end of the last, or next adjacent steam loop. The loops in rear of said valve K are, therefore, always filled with cold air and all or a greater part of the moisture contained therein will condense and fall down into the radiator base and from thence be discharged from the radiator. Whatever moisture is contained in the cool air in the rear loops of the radiator it becomes heated as the air passes through the valve K and expands so that when the air issues from the thermostat the moisture is not in a free state or in condition to soil the wall to which the thermostat is attached or other parts adjacent to the thermostat J. The purpose of the construction just described, therefore, is first, to cool the air prior to its passage from the radiator through the thermostat so as to condense therefrom the greater part of the water or moisture therein, and, secondly, to heat the air as it passes through the valve K so that any moisture contained in the air will be rendered harmless at the time the air issues from the thermostat J to soil surrounding objects.

Figure 12:
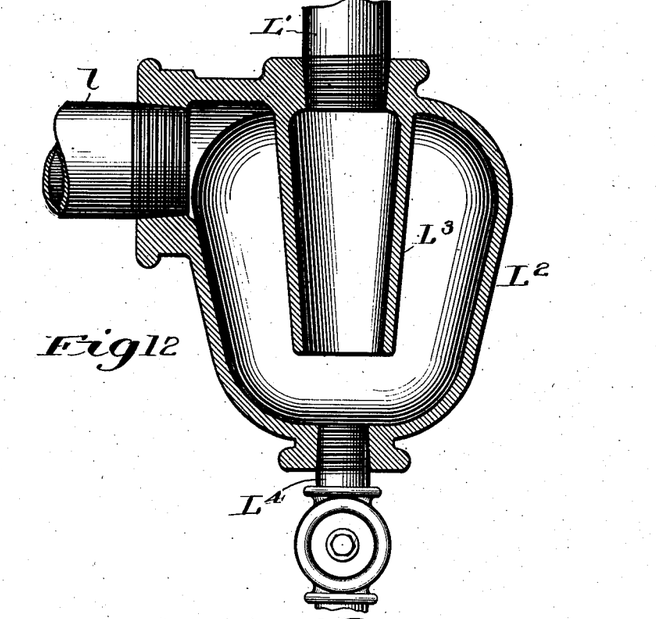
Fig. 12 is an axial section of the individual seal fitting located between the water-of-condensation-pipe of the radiator shown in Fig. 11 and the steam supply pipe.
Figure 13:
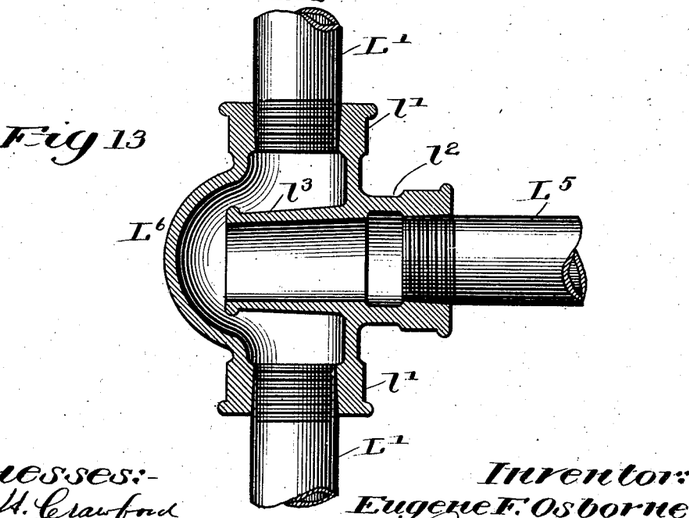
Fig. 13 is an axial section of a fitting located in the water-of-condensation-pipe of the radiator shown in Fig. 11.

In Fig. 11 I have shown the precautionary measures last described as applied to a coil form of radiator L, and the detail view shown in Fig. 14 shows its application to such form. Steam is delivered to one side of said radiator through a pipe $C^1$ and the water of condensation is conducted therefrom through a return pipe $L^1$. Said return pipe discharges into an individual seal fitting $L^2$, shown in detail in Fig. 12, and said fitting $L^2$ communicates by means of a pipe $l$ with the steam main $C^1$. The fitting $L^2$ (Fig. 12) consists of a chambered casting provided with a depending nipple $L^3$ into the upper end of which is screw-threaded the lower end of the return pipe $L^1$. The lower end of the nipple $L^3$ is located below the level of the pipe $l$ whereby the return pipe $L^1$ is sealed against the passage of steam or gaseous vapor in either direction, while affording a free passage for the water from the return pipe $L^1$ to the steam pipe $C^1$. The lower end of the fitting is provided with a valved draw-off or drain pipe $L^4$. Communicating with the return pipe $L^1$ is a horizontal pipe $L^5$ constituting in effect, one of the coils of the radiator. Said pipe $L^5$ communicates with the return pipe $L^1$ through the medium of a fitting $L^6$, shown in detail in Fig. 13. Said fitting consists of a hollow casing provided with upper and lower branches $l^1$ $l^1$ which receive the ends of the sections of the pipe $L^1$ and with a lateral branch $l^2$ which receives the adjacent end of the pipe $L^5$. The branch $l^2$ is provided interiorly of the fitting with a horizontal prolongation $l^3$ which extends past the branches $l^1$ and provided at its end with an annular head, whereby the water of condensation from the pipe $L^1$ does not tend to find its way into the pipe $L^5$. The end of the pipe $L^5$ remote from the fitting $L^6$ corresponds, in its relation to the radiator L, with the loops of the radiator $E^1$ in rear of the valve K. That is to say, said part of the pipe is designed to be relatively isolated from live steam and to receive a body of cold air and contain the air valve K which controls the discharge of cold air from said pipe. Said thermostatic valve fitting enters an enlargement or chamber $L^7$ of said pipe, shown best in Fig. 14. The inlet branch $k$ of said fitting communicates by means of a pipe $l^4$ with the rear end of the pipe $L^5$ and the outlet branch $k^1$ of the fitting communicates by a pipe $l^5$ with the thermostat J. The chamber is provided with a vertical diaphragm $L^8$ located between the ends of the sections of the pipe $L^5$ in which the chamber is included. The lower edge of said diaphragm is adapted to be submerged in the water contained in said fitting, whereby steam and air are prevented from passing beneath said diaphragm from one side thereof to the other; and the cold air is prevented from passing over the diaphragm into the steam side of the device by reason of its superior weight, relatively to steam. The operation of this feature of construction is the same as that heretofore described in connection with radiator $E^1$. That is to say, a cold body of air is held in the part of the pipe $L^5$ in rear of the valve fitting K so long as the valve is maintained closed, permitting moisture to condense therefrom, and when the valve K opens, by reason of the cooling of the thermostatic actuating members thereof (which occurs when a body of cold air collects in the pipe $L^5$ and in the pipe $L^1$ between the valve K and the radiator), the cold air is permitted to pass from the pipe $L^5$ through the pipes $l^4$ and $l^5$ and valve fitting K to the thermostat frame whence it escapes into the atmosphere. Such escape of the cool air continues until steam, passing through pipe $L^1$, fitting $L^6$ and pipe $L^5$, reaches the valve fitting K and acts thereon to again close the valve thereof.

When a radiator is used in a public hallway or other like place (where, however, a regulation is desired) the escape of a small amount of aqueous vapor through the equipment shown in connection with the radiator $E^2$ (Fig. 1) will ordinarily be unobjectionable, and in that case the usually located and constructed air valve of the radiator may be connected directly with the thermostat J. The precautionary equipment described is designed for use where the radiators are located in places where the escape of an appreciable quantity of water is objectionable.

It may often occur in the use of a system of the character described (in a resistance or other like place) that it is desired to retain the heat in one or more radiators of the system during a given period, as during the night time, and to allow the other radiators of the system to become cooled. In order to meet such requirement, and at the same time avoid the generating of the steam in the generator at a pressure equal to that of the atmosphere or greater during the night or such other period of inactivity of the principal parts of the system, I have provided means whereby the heat remaining in the boiler after firing of the generator has ceased or has been reduced and at a time when one or a limited number of radiators are to remain heated, may be directed to the radiator or radiators to remain in service, to the exclusion of the other radiators, so long as any steam remains in the system. The partial operation of the system in this manner may be effected either by the residual heat of the boiler after firing has ceased, or the firing may be continued during a given period with a reduced supply of fuel. The parts are so constructed that, when such use of the system is resorted to, the radiator or radiators remaining in service may operate under pressure so long as the steam in the system is above atmospheric pressure, after which the radiators so remaining in service operate under a reduced pressure as long as any steam remains in the system in condition for use. This result is attained by the equipment of radiator $E^1$, shown in Fig. 1, which is made as follows: If it be assumed that the radiator $E^1$ is to be heated in the manner described and that the other radiators of the system are to be temporarily put out of service, the valve $E^3$ of the radiator $E^1$ is closed. Thereafter steam is conducted to all of the radiators of the system in the usual manner until the pressure in the system is reduced to or below atmospheric pressure. When this occurs no further steam is delivered into the radiators in which the valves thereof and associated thermostatic valves J are open, owing to the fact that the interior of the radiator is open to the outside air through said valves. The air in said radiators under atmospheric pressure is prevented at this time from passing into the system by the check-valves in the feed fitting thereof, the check-valves being closed by gravity and held shut by the pressure on the upper sides thereof. In the radiator ($E^1$ in the present example) having the closed air valve, however, there is no communication between the radiator and the outside air through such air valve and thermostat J, so that said radiator $E^1$ operates under a reduced pressure to receive the steam from the system which has been reduced below atmospheric pressure. In this manner all of the steam contained or generated in the system after the firing has been discontinued or released may be directed to one or a limited number of the radiators of the system. It will be understood that when the system is operated in the manner just described air will not be admitted to the system, except that entrained in the steam, so that the radiator operating under reduced pressure does not become filled with air. In such use of the system, the regulative action of the air is not required.

Referring now to the particular mechanism herein shown for introducing air to the radiators, such mechanism is made as follows:—O designates a fitting which is located in the main steam pipe C and provided at its upper side with an opening through which extends the nipple $p$ of a casing P, said nipple having screw-threaded engagement with the casing O. Said casing P is provided in its opposite walls with inlet and outlet branches $p^1$ $p^2$ and is provided internally between said branches with a partition or diaphragm $p^3$ in which is formed an opening $p^4$ through which said branches communicate with each other. $P^1$ $P^2$ designate upper and lower valves having tapered faces which separately seat against correspondingly shaped seats surrounding the opening $p^4$ above and below the same. $P^3$ designates a tube which is closed at its lower end and extends downwardly through the nipple $p$ into the interior of the fitting O and is subject to the direct action of the steam in the pipe C. Said tube communicates at its upper end with a plurality of hollow, closed, disk-shaped bulbs or chambers $P^4$ located in the casing P. Said tube $P^3$ extends downwardly from a disk or plate $p^6$ extending across the lower end of the chamber just above the nipple $p$, said plate constituting a connection between said tube and bulbs or chambers. The walls of said bulbs are made of such material that they are expansible and collapsible so that upon the existence of an internal pressure in said chambers the series of chambers longitudinally expand and tend to contract or shorten upon the release of pressure therein. The valves $P^1$ $P^2$ are attached to and movable with said series of bulbs or chambers and are, therefore, opened and closed through expansion and contraction of said parts. The tube $P^3$ constitutes a boiler which is filled with a liquid having a lower boiling point than that of water. The liquid in said tube or boiler when converted into steam or vapor expands said bulbs longitudinally in a manner to move the lower valve toward its seat. Other means of subjecting the tube or boiler to the action of the heating steam may be made as efficient as the arrangement herein shown. When the system is out of action and no steam exists in the pipe C the upper valve is held against its seat by means of a spring $p^7$ and said valve is moved off its seat against the action of said spring by force of the steam or vapor acting on said expansible and contractible bulbs or chambers. Said spring $p^7$ bears against the upper face of the upper valve and surrounds a guide stem $p^8$ for the valve extending upwardly therefrom and the upper end of said spring is seated in an annular recess in the lower end of an adjusting shaft $p^9$ which extends downwardly through the neck $p^{10}$ of the casing P and has screw-threaded engagement therewith. Said shaft is provided at its upper end with a hand-wheel $p^{11}$ by which it may be forced downwardly through said neck against the spring $p^7$. The said adjusting shaft is provided with an axial opening or socket to receive the guide stem $p^8$. The inlet branch $p^1$ is connected with a pipe Q which leads from an air pump R of any suitable type. The outlet branch of said casing is connected by means of a pipe S with the steam supply pipe between the fitting P and the heating devices.

The parts of the apparatus which have been described are so constructed and arranged that the valves $P^1$ $P^2$ are not lifted under the initial pressure of the system, but are adapted to be set so as to be operated to admit air into the system under a predetermined minimum pressure, whatever may be fixed upon; and, furthermore, the lower valve is adapted to close the valve when the pressure in the system exceeds a given maximum. This practice is followed, for the reason that under ordinary circumstances the regulative or controlling influence of air is not required when operating under the lower pressure of the steam nor under the highest pressure of steam used in the operation of the system. The spring $p^7$ therefore is given such tension when the device is installed that the valve against which it acts will remain closed until a certain predetermined minimum pressure and correlative temperature in the system has been attained. Thereafter the pressure of the vapor of the contents of the chambers or bulbs $P^4$ overcomes the force of the spring $p^7$ and the valve is opened to permit air to enter the system to assert its controlling influence on the radiating capacity of the radiators, as has heretofore been described. Furthermore, in unusually cold weather when steam under high pressure is employed to heat the radiators, it is ordinarily desirable to dispense with the air controlled feature of the apparatus; and the parts are so arranged that when a predetermined or selected maximum pressure exists in the system, the valve $P^2$ is automatically raised against the seat, thereby preventing the further entrance of controlling or displacing air into the system. At this time the force of the spring $p^7$ is entirely overcome. It will thus be seen that the controlling influence of air is utilized during the intermediate stages of the temperature range of the steam and is dispensed with at the extreme high and low temperatures. The length of the intermediate or regulable stage of the range of pressures and correlative temperatures may of course be readily determined and maintained by a proper adjustment of the spring $p^7$.

Figure 15:
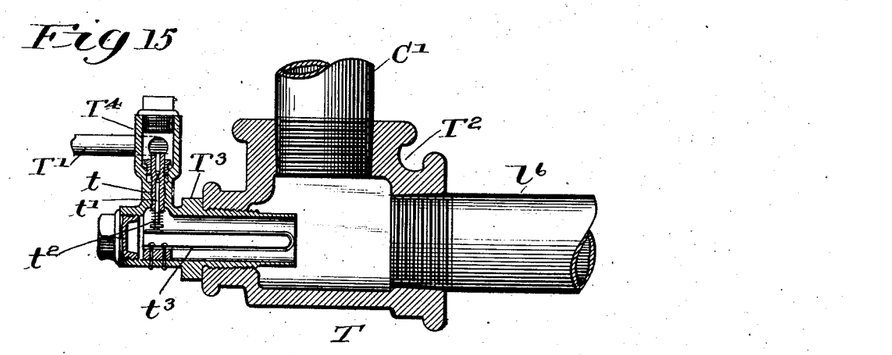
Fig. 15 is a sectional view of a thermostatically actuated valve located at the steam receiving side of the radiator for cutting the steam pipe out of communication with the radiator when the latter has become filled with air.
Figure 16:
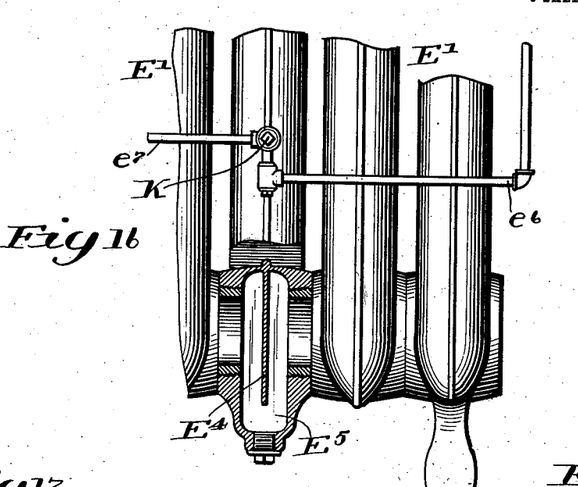
Fig. 16 is a fragmentary view of the form of radiator shown in Fig. 1, illustrating the application thereto of the thermostatically actuated valve, shown in Fig. 14.
Figure 17:
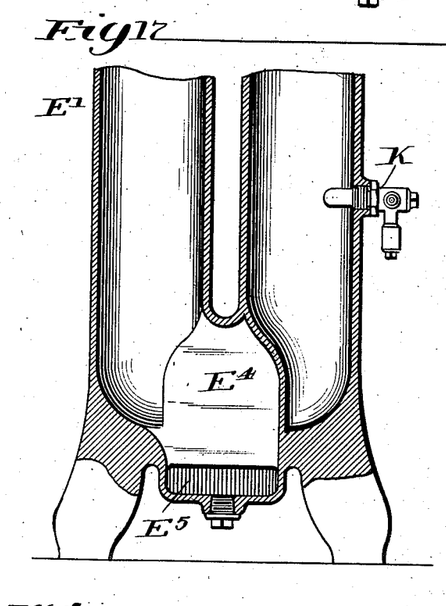
Fig. 17 is a fragmentary vertical section thereof, taken in a plane at right angles to the view shown in Fig. 16.
Figure 18:
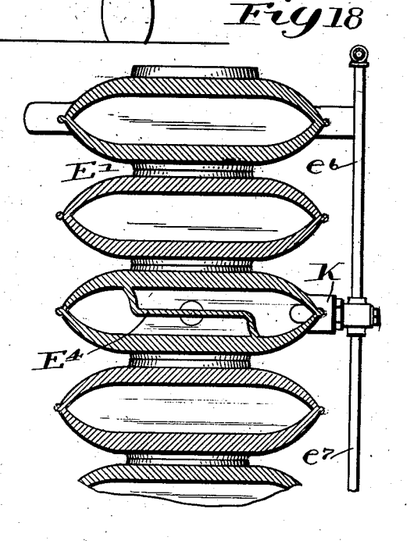
Fig. 18 is a transverse section thereof, taken in a plane above the thermostatically actuated valve and the pipes communicating therewith.
Figure 19:
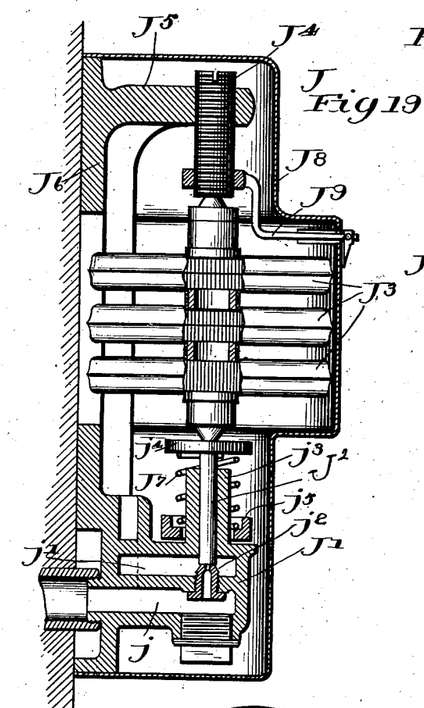
Fig. 19 illustrates a practical form of thermostat shown partially in side elevation and partially in section.
Figure 20:
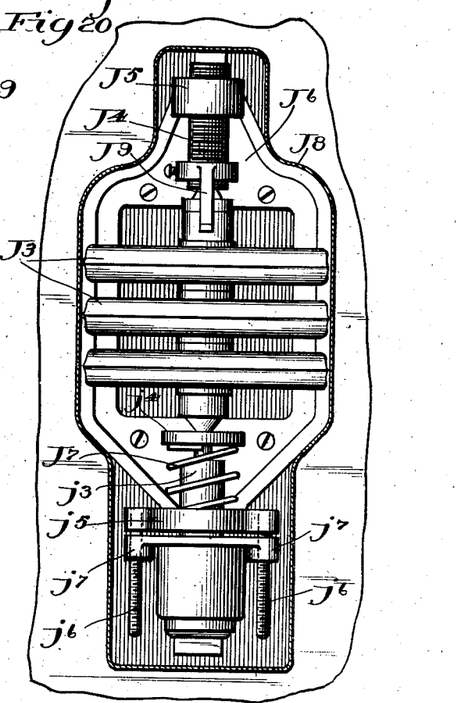
Fig. 20 is a front elevation of the operative parts of the thermostat.

In Fig. 15 is shown a fitting T designed for use in a system where the regulating or displacing air is separately admitted to the radiators instead of being introduced into the system at a central point therein. Said fitting is shown as applied to the radiator shown in Fig. 11 and in said figure, $T^1$ designates the individual air line leading to said fitting through which air is delivered to the radiator. Said fitting consists of a casing $T^2$ provided at one end with a screw-threaded opening which receives the feed pipe $l^6$ of the radiator, and provided at its upper side with a screw-threaded opening which receives the steam supply pipe $C^1$. The end of the casing remote from the radiator pipe $l^6$ receives a tube $T^3$ which has screw-threaded engagement with the casing and extends a distance thereinto. Said tube is provided with a branch $T^4$ with which the air pipe $T^1$ communicates. Located in said branch $T^4$ is a valve consisting of a short tube $t$ which has screw-threaded engagement therewith and which contains an endwise movable stem $t^1$ having a tapered end which engages a tapered seat in the bore of said tube. A spiral spring $t^2$ surrounding said stem and interposed between a head on said stem and the end of the tube $t$ tends to normally hold the valve open and the valve is adapted to be closed by a thermostatic member $t^3$ located in the tube $T^3$. Said thermostatic member is so set or arranged as to close the valve against the action of the spring $t^2$. With this construction, when the radiator becomes filled with air and the air impinges against the thermostatic member $t^3$ the air valve is closed, thereby stopping the delivery of air to the radiator until the air is evacuated from said radiator.

The construction is useful when used in a building where, by reason of the location of one or more of the rooms or apartments, such rooms or apartments are at times maintained sufficiently heated without the use of the heating device or devices located therein. For instance in a building of a number of stories, where the radiators are located in rooms one above the other, the rooms of the upper story or stories may become heated, by reason of the heated air rising from the lower stories so that the thermostats of the radiators in the upper rooms will operate to close off the supply of steam to the radiators located in said upper rooms before such upper rooms are heated by their own radiators, and will remain heated by reason of the upwardly rising heated air currents from the lower rooms. In such event the cooling of the radiators of the upper rooms, by reason of said radiators becoming filled with air, will not serve to open the valves of their thermostats, but said valves will remain closed by reason of the heat from the heated air rising thereto from below. In this event it becomes desirable to shut off the supply of air to the upper radiators so that air will not constantly leak from the air supply apparatus through the air filled radiators into the system, and thereby result in a wastage of power required to supply the air. With the construction just described when the radiators of the upper rooms become filled with air and the rooms are so warm as to maintain the release valves of their controlling thermostats closed, the cold air impinging against the thermostatic member $t^3$ of the fitting T closes the supply of air to the radiators and prevents the wasteful passage of air therethrough into the system.

In Figs. 19 to 22 I have shown an approved form of thermostat J through which air is discharged from the radiators under the regulative control of the temperature of the apartments in which the radiators are located. The thermostats are set to release the air from the radiators at a selected or predetermined minimum temperature in the apartments, whereby, when such temperature is reached the thermostat acts to release the air or displacing agent, thereby admitting more steam into the radiators with a result of raising the temperature of the apartment until the thermostat is again closed. The thermostat is so constructed and regulated that these operations are carried on under closely governed conditions so that variation of temperature which takes place in the apartment is within narrow limits, whereby a substantially constant temperature is maintained.

Figures 21, 22, 23:
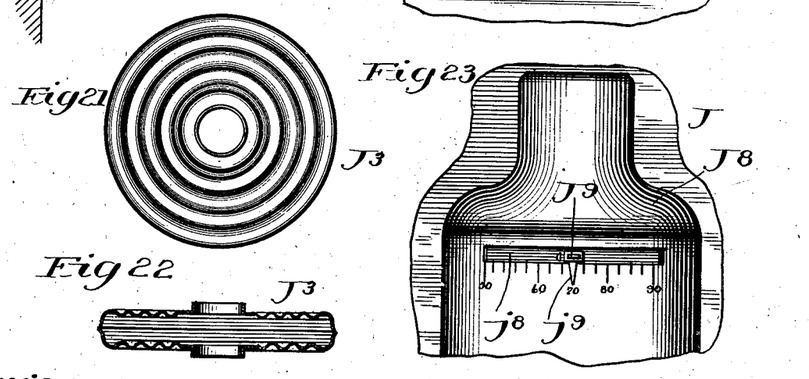
Figs. 21 and 22 are details of one of the expanding chambers of said thermostat.
Fig. 23 is a front elevation of the casing of the thermostat, showing the setting scale and indicator.

The thermostat consists of a casing $J^1$ having a passage $j$ which communicates with the radiator and through which air passes from the radiator to the thermostat, and with an outlet passage $j^1$ which may discharge air into the apartment in which the thermostat is located or may discharge it through a pipe to a point outside of the room. Between said passages $j$ and $j^1$ is located a port formed in a nipple $j^2$ which is designed to be closed by a valve formed on the end of a stem $J^2$, which has guiding engagement with a sleeve $j^3$ rising from the top wall of said casing $J^1$. The valve is held against its seat by means of a thermostatic device consisting of a series of communicating, independently expansible and collapsible bulbs or chambers $J^3$ which are interposed between said stem $J^2$ and an adjusting screw $J^4$ extending downwardly through a horizontal arm $J^5$ of a bracket or frame $J^6$ by which the device is supported on a wall or like place. The chambers $J^3$ are filled with a liquid which vaporizes at or about the selected maximum temperature of the apartment, and when such temperature is reached the vaporization of the liquid therein longitudinally expands the chambers and exerts pressure on the stem $J^2$ to close the valve. The closing tendency of the thermostatic device is resisted by a spring $J^7$ made of spiral form surrounding the guide sleeve $j^8$ and interposed between a head or flange $j^4$ at the top of the valve stem $J^2$ and an adjusting plate $j^5$ surrounding said sleeve at the lower end thereof. Said plate is adjusted by means of laterally separated screws $j^6$ connected with extensions or lugs of said plate and having screw-threaded engagement with lugs $j^7$ extending laterally from the valve casing $J^1$. The device is inclosed by a suitably formed casing $J^8$. The top adjusting screw $J^4$ for the thermostatic device is adjusted by a lever $J^9$ fixed thereto and extending through a horizontal slot $j^8$ in the side wall of the casing $J^8$, as shown in Fig. 23, and said lever is provided with an index or pointer $j^9$ which coöperates with a scale on the outer curved face of said casing.

It is manifest that the invention may be embodied in an apparatus and parts thereof different widely in structural details and relative arrangement from that herein shown, and the apparatus shown is, therefore, to be considered merely illustrative and is not to be regarded as limiting the scope of the invention, except as in such instances as an approved detail of structure or arrangement is made the subject of specific claims.

I claim as my invention:—

1. In a steam heating system, means controlled by the temperature of the steam in the feed side of the system for introducing a displacing agent into the system and intermixing it with the steam therein, and means whereby said displacing agent is excluded from the system during a selected range of temperature of the steam.

2. In a steam heating system, means controlled by the temperature of the steam in the feed side of the system for introducing a displacing agent into the system and intermixing it with the steam therein, and means whereby the displacing agent is introduced into the system during the intermediate temperature of the steam and is excluded therefrom during its extreme temperatures.

3. In a steam heating system, the combination with a steam distributing pipe, of a source of displacing agent, a pipe leading from said source and discharging into the system, a casing located in said last mentioned pipe provided with a port through which said displacing agent passes, and provided on opposite sides of said port with seats, two valves, one coöperating with one seat and the other with the other seat of said port, and a thermostatic device connected with and operating said valves and subject to the heat of the steam in said distributing pipe.

4. In a steam heating system, the combination with a steam distributing pipe, of a source of displacing agent, a pipe leading from said source and discharging into the system, a casing located in said last-mentioned pipe provided with a port through which said displacing agent passes, and provided on opposite sides of said port with seats, two valves, one coöperating with one seat and the other with the other seat of said port, a thermostatic device responsive to the heat of the system connected with said valves and acting to move one of the valves off of its seat and to seat the other valve, and a spring acting against said thermostatic device.

5. In a steam heating system, means controlled by the temperature of the steam in the feed side of the system for introducing a displacing agent into the system, and intermixing it with the steam therein, means whereby the displacing agent is excluded from the system during a given or selected range of temperature and means for varying the temperature at which said agent is excluded.

6. In a steam heating system, the combination with a plurality of heating devices, a distributing pipe for introducing steam and a displacing agent to said heating devices and means for controllably releasing the displacing agent from said heating devices, of means associated with said distributing pipe for supplying a greater proportion of the displacing agent to certain of the heating devices than to others.

7. In a steam heating system, the combination with a steam distributing pipe, means for introducing a displacing agent into said pipe, a plurality of heating devices receiving steam and the displacing agent from said pipe and automatic means controlled by the temperature of the apartments in which the heating devices are located for controllably releasing the displacing agent from said heating devices, of means associated with said steam distributing pipe whereby certain of the heating devices receive a larger proportion of the displacing agent than others.

8. In a steam heating system, the combination with a steam heating device, and means for delivering steam thereto, of means for introducing a displacing agent into said device, a thermostat which is operated by the temperature in the apartment containing the heating device and connected by a pipe with the heating device on the side remote from the steam inlet thereof, and a thermostatic air valve located in said pipe, and communicating with the heating device at a point between the receiving and exhaust sides thereof.

9. In a steam heating system, the combination with a steam heating device, and means for delivering steam thereto, of means for introducing a displacing agent into said heating device and intermingling it with the steam, a thermostat operated by the temperature of the apartment containing the heating device and connected by a pipe with the heating device for withdrawing the displacing agent therefrom and means located between the thermostat and the connection of said pipe with the heating device for heating the displacing agent after it has been discharged from the heating device.

In testimony, that I claim the foregoing as my invention I affix my signature in presence of two witnesses, this 21st day of November A. D. 1903.

EUGENE F. OSBORNE.

Witnesses:
C. CLARENCE POOLE,
GERTRUDE J. BRYCE.